Patented July 11, 1944

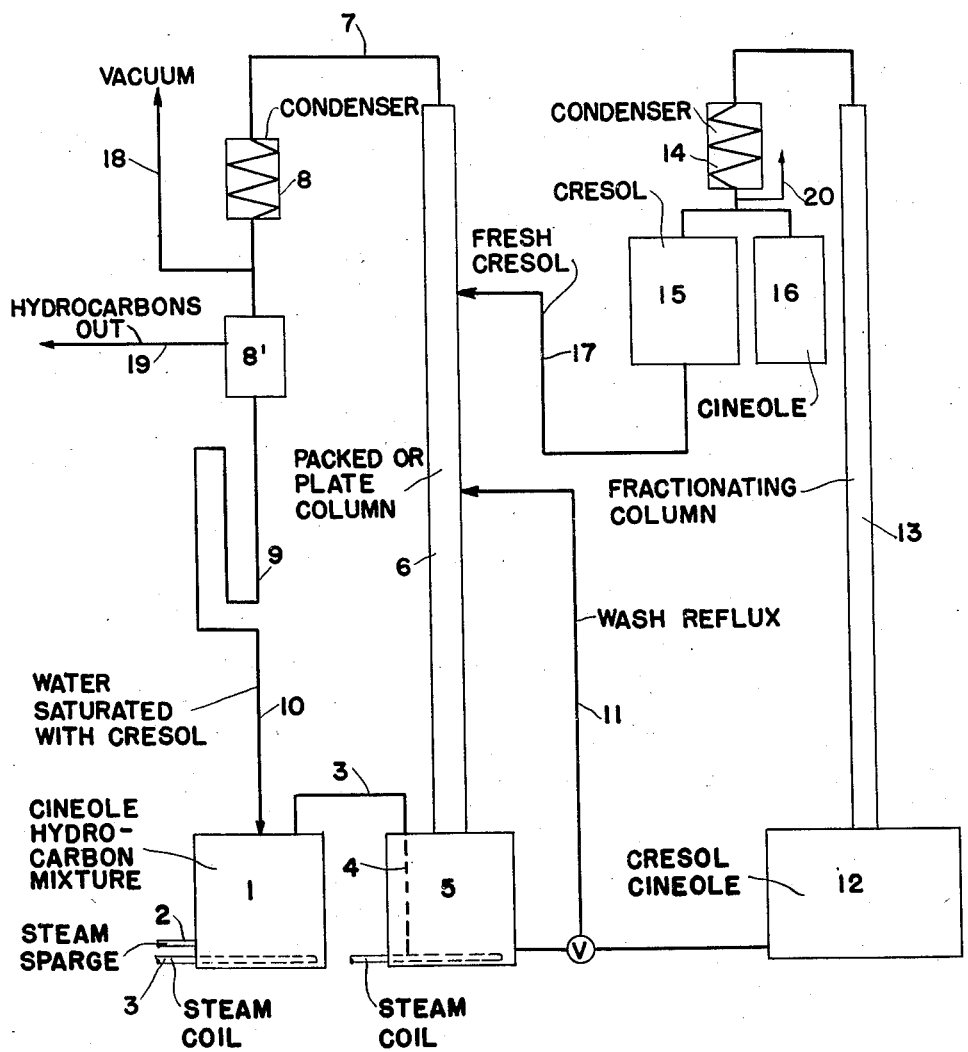

UNITED STATES PATENT OFFICE 2,353,319

2,353,319

SEPARATION OF CINEOLE FROM HYDROCARBONS

Donald H. Sheffield, Wilmington, Del., assignor to Hercules Powder Company, Wilmington, Del., a corporation of Delaware Application April 12, 1941, Serial No. 388,238

14 Claims. (Cl. 202—40)

This invention relates to the separation of cineoles from hydrocarbons of a similar boiling range and more particularly to such separation accomplished by a process of vacuum steam distillation.

In certain manufacturing operations, as for example in the production of cineole by the dehydration or isomerization of terpene compounds, a mixture of hydrocarbons, boiling within the range 172° C.–190° C., is obtained. Since 1-8 cineole boils at a temperature of approximately 176° C. and 1-4 cineole at 172° C., it was, for a long time, considered impractical to effect a separation of the mixed hydrocarbons and cineoles by any known process utilizing fractional distillation.

More recently it has been suggested that a very effective separation of the cineole and mixed hydrocarbons may be obtained by distilling the mixture in the presence of a phenolic body, such as for example, the cresols, which have a substantially different boiling point from said range. According to this method, the phenolic body which is added to the mixture of cineole and hydrocarbons before distillation forms a loose addition compound with the cineole present and this compound having some slight stability in the early stages of distillation enables a fractional distillation to be carried out. It is thus possible to fractionate off the hydrocarbons and after their removal, as the temperature in the still rises, to distill off the cineole from the phenolic body. This results in distillate fractions containing relatively pure hydrocarbons, mixtures of the hydrocarbons and cineoles, and relatively pure cineoles respectively. The intermediate mixture containing hydrocarbons and cineoles may be recycled to recover further quantities of relatively pure cineoles and hydrocarbons. This process is carried out by putting the cineole-hydrocarbon-phenolic body mixture in a vacuum-fractionating still and subjecting to distillation under an absolute pressure of about 20 mm. of mercury.

Applicant has found that substantially improved results may be obtained in the separation of cineole from hydrocarbons of similar boiling range by azeotropic steam distillation of a mixture of cineoles, hydrocarbons, and cresols in vacuum. According to applicant's improved process, the vapor passes through several cresol "washes," cresol flowing countercurrent to the vapor (cineole-hydrocarbon-steam). The temperature of vapor and washing media at vacuums of 27–28 inches of mercury does not exceed 65° C. Hydrocarbons and water are recovered as the distillate and cresol-cineole as the residue.

It is therefore an object of the present invention to provide an improved process and apparatus for separating cineoles from hydrocarbons of a similar boiling range, whereby the cineoles and hydrocarbons may be recovered in a substantially pure state and in substantially increased yields over that obtainable with prior known methods and apparatus.

It is a further object of the invention to separate cineoles from hydrocarbons of similar boiling range by steam distilling the cineole-hydrocarbon mixture through cresols in vacuo whereby operating temperatures, lower than those hitherto thought possible, are obtainable thus resulting in greater stability of the cineole-cresol complex and hence a more effective separation of the cineoles and hydrocarbons.

It is a still further object of the invention to separate cineoles from hydrocarbons of similar boiling ranges by a process of steam distillation whereby vapor pressure relationships are altered in such manner as to increase the tendency of the cineoles to remain in solution, thus permitting a more effective separation of the cineole-hydrocarbon mixture.

A further object of the invention is the steam distilling of cineole-hydrocarbon mixture whereby a vapor including cineole, hydrocarbons and steam is passed through several cresol washes, the cineole being azeotropically condensed with cresol and retained as a residue and the hydrocarbons passing off as distillate.

Other and further objects of the invention will be obvious upon an understanding of the illustrative embodiment to be described or will be indicated in the appended claims, and various advantages not referred to herein will occur to one skilled in the art upon employment of the invention in practice.

The objects of my invention may in general be carried out by steam distilling a cineole-hydrocarbon mixture under vacuum, passing the vapor so formed through several cresol washes thereby separating the mixture into a hydrocarbon distillate and a cineole-cresol residue, separately withdrawing the hydrocarbon distillate and the cineole-cresol mixture, and separating the cineole from the cresol by fractional distillation.

A preferred embodiment of the invention has been chosen for purposes of illustration and description and is shown in the accompanying drawing forming a part of the specification wherein the figure is a schematic drawing of one type of apparatus suitable for carrying out the process of the present invention.

Referring to the drawing herein for a more detailed description of the invention, the numeral 1 designates a chamber into which a mixture of cineole and hydrocarbons is introduced and subjected to steam distillation. Chamber 1 may comprise a well-known type of still provided with means 2 for admitting steam to steam sparge the material therein, and also, if desired, with a steam-heating coil 3 to vaporize the condensate water returned to the system, together with the cineole-hydrocarbon mixture.

The cineole-hydrocarbon-steam vapor formed in the chamber 1 passes through pipes 3 and 4 into a chamber 5 containing a cresol or equivalent material, the pipe 4 extending downwardly into the cresol to permit the vapors to pass upwardly therethrough. The tank 5 is provided with a steam-heating coil which is so regulated and controlled as to maintain the temperature of the solution in tank 5 within the range of about 50 to 65° C.

The vapor, passing out of the chamber 5 and consisting essentially of the hydrocarbons with smaller amounts of cineoles, water vapor and cresol passes upwardly through a packed or plate column 6 in countercurrent relation to cresol and a cresol-cineole mixture introduced in a manner to be pointed out more particularly hereinafter. As the vapors pass upwardly through the plate column, they come into intimate contact with the cresol and cresol-cineole mixture thus condensing a substantial portion of the cineole which may have been vaporized. The hydrocarbon-cresol-water vapor passes through pipe 7 into condenser 8 where condensation is effected, the condensate then passing to the separator 8' mounted at one end of the barometric leg 9, where the hydrocarbon fraction is withdrawn. The water saturated with cresol passes downwardly through the pipe 10 to be mixed with the cineole-hydrocarbon mixture in still 1.

The cineole-cresol mixture is withdrawn from chamber 5, a portion passing through the pipe 11 to the plate tower 6 as a reflux wash and another portion passing to the still 12 from which it is distilled in known manner. Cresol and cineole vapors from the still 12 pass upwardly through the fractionating column 13, to the condenser 14, the cresol being collected in a tank 15 and the cineole in a tank 16. Cresol from the tank 15 passes through a pipe 17 to the plate column 6 as a countercurrent cresol wash.

The scrubbing system and the cresol-cineole fractionating column are maintained under high vacuum through the medium of any suitable type of vacuum pump connected to the pipes 18 and 20.

In carrying out the process of the present invention, the cineole-hydrocarbon mixture in the still 1 is steam sparged and if desired additionally heated by a steam coil. The purpose of the steam sparge is twofold, i. e., to heat the mixture and to introduce water vapor. It is desirable that the temperature within the chamber 1 be maintained within the range from about 30° C. to 80° C. This may be effected entirely by the steam sparge, in part by the steam sparge and in part by the steam coil, or entirely by the steam coil. In the latter case, even though steam is not directly introduced, the mixture is effectively steam sparged by vaporization of water return condensate from the separator 8'. Although the particular conditions given are preferred, it is to be understood that these are not to be construed as limiting since other operating conditions are possible.

The effect of the steam sparge either supplied from an external source or by vaporization of return water condensate, and heating with the steam coil, is to vaporize the mixture of cineole and hydrocarbons. These vapors together with water vapor pass to the chamber 5 and bubble upwardly through the cresol contained therein. Under the temperature and pressure conditions maintained in the chamber 5, the major portion of the cineoles is held back with the cresol, and the hydrocarbons along with lesser amounts of cresol, water, and some cineole pass upwardly through the column 6 in the form of vapor. The action which takes place in the chamber 5 and column 6 may best be explained in the following manner.

It is well known that cineoles and cresols form an additive compound which, though unstable at elevated temperatures, is sufficiently stable at lower temperatures to partially hold the cineoles and allow the hydrocarbons to distill. Thus, at temperatures of 50–65° C. and vacuums of 27 to 28 inches of mercury, the cineoles form addition compounds with the cresol which compounds are substantially stable at the temperatures used. Moreover, the addition of water vapor produces a hydrocarbon-water mixture which boils at a lower temperature than the hydrocarbons alone. The hydrocarbons will, therefore, steam-distill at these temperatures and pass off along with the water vapor and a small amount of cresol.

As the vapors from the chamber 5 pass upwardly through the plate column 6, they are thoroughly washed by the cresol-cineole mixture introduced to the column through pipe 11 and by fresh cresol introduced through pipe 17. This treatment results in two things; (1) the vaporizing of any hydrocarbons mixed with the cresol-cineole mixture and (2) the condensation of any cineole in the vapors and the consequent formation with the cresol of an addition compound. The enriched hydrocarbon vapors together with some cresol and the water vapor pass from the plate column and are separated in the manner hereinbefore pointed out, the substantially cineole free hydrocarbons being withdrawn through pipe 19, and water, saturated with cresol, being returned to the chamber 1 for revaporization. The hydrocarbon fraction can be further purified, if desired, by additional fractionation or other treatment. It can, for example, be fractionated into three cuts, the first of which contains no cineole, the second of which contains a small percentage of cineole and the third of which is cresol suitable for re-use in the process. The second cut, containing a small percentage of cineole, may be and desirably is returned to the chamber 1 for reprocessing. The third cut, containing cresol, may be introduced at any suitable point for re-use in the process. The first cut represents hydrocarbons recovered in a form free of the cineoles with which they were mixed.

A cresol-cineole mixture is withdrawn from the still 5 and subjected to fractional distillation in the still 12 and fractionating column 13. Substantially pure cineole, comprising a mixture of 1–4 and 1–8 cineoles, is collected in the tank 16, and cresol in the tank 15, the cineoles being obtained as the lower boiling fraction. Fractionation may be accomplished either at atmospheric pressure or in vacuo, but preferably in vacuo. The cineole fraction may be freed of minor cresol content by washing with dilute alkali. If desired, refractionation may be applied to effect removal of the cresol prior to the washing step.

By the process of the present invention, applicant recovers not only the cineoles but also obtains the hydrocarbons in a substantially pure condition for examination and identification.

Results obtained by the process of the present invention show increased efficiency as to purity and yield over that obtained by prior known processes. This is primarily attributable to the idea of steam distilling the cineole-hydrocarbon mixture through cresols under high vacuum and low temperatures. Countercurrent washes of cresol and cresol-cineole mixture likewise make for increased efficiency.

Applicant's process differs from prior known processes utilizing cresols in the separation of cineoles from hydrocarbons of similar boiling ranges in that (1) by utilizing steam, lower temperatures are operable and thus greater stability of the complex is maintained and (2) by using steam, vapor pressure relationships are advantageously altered. Hydrocarbon-water mixture has a higher vapor pressure than cresol-water mixture largely because water and cresol are many time more mutually soluble than are the hydrocarbons and water. Thus, the cresol, in which the cineoles are both soluble and reactive, is maintained in the liquid phase while the hydrocarbons vaporize.

Applicant's process is equally applicable to the separation from hydrocarbons of similar boiling range of 1,4-cineole, 1,8-cineole or mixtures of 1,4-cineole and 1,8-cineole. The use of other cresols than orthocresol is also contemplated. Thus, for example, meta or paracresol or mixtures of the two are very satisfactory. Other phenolic substances having a higher boiling point than the cineole-hydrocarbon mixture such as resorcinol, carracrol, thymol, catechol, etc., and which form addition compounds with the cineoles are possible though the ones specifically mentioned above are preferred.

Where in the specification hydrocarbon or hydrocarbons are referred to, it will be understood that I mean the hydrocarbons having a similar boiling range to the cineoles and from which the cineoles are to be separated. The word cresols has been used generically to cover orthocresol, paracresol, metacresol or any suitable mixtures of these compounds.

In order to illustrate the invention, but without intending to be limited thereby, the following example is given.

*Example I*

Three distilling flasks were connected in series each with a sparge tube in such manner that the vapor entering the first flask passed through the contents of the second, the vapor of the second through the contents of the third, and the vapor from the third passed through a condenser to a receiver at which point vacuum was applied. 500 grams of orthocresol was charged to each flask, and in addition, into the first 850 grams of a cineole-terpene hydrocarbon cut containing 51% cineoles.

The contents of each flask in the system was heated to a temperature within the range of 50-65° C., 27-28 inches vacuum applied and then steam was admitted to flask 1. While holding the temperature within the above range, steam distillation was continued until 40 to 60% of the oil added was recovered as condensate—the vapor having passed through cresol in flasks 2 and 3.

Flask 1 was then discharged, its contents being held to be cineole-cresol fraction. The contents of flask 2 was transferred to flask 1; the contents of flask 3 to flask 2; and fresh cresol was charged into flask 3. Additional cineole-terpene hydrocarbon cut was added to flask 1, and the above described operation repeated. This operation was repeated 5 times. 3,625 grams of cineole-hydrocarbon mixture was treated by 2,675 grams of orthocresol in the above manner to yield 3,961 grams of cineole-cresol fraction (removed from flask 1) and 2,080 grams of distillate.

The cineole-cresol fraction was fractionated into three cuts: (1) Cineole-hydrocarbon (for retreatment) 885 grams. (2) Cineole-cresol—1,355 grams. (3) Orthocresol residue. The cineole-cresol cut was washed with alkali solution to recover 961 grams of cineoles. The product contained 97.5% of 1-4 and 1-8 cineoles.

The distillate, which is essentially terpene hydrocarbons, was fractionated to recover 813 grams of a cut containing no cineoles; 764 grams of hydrocarbon-cineole cut from reprocessing and 245 grams of cresol suitable for re-use.

The process of the prevention may be operated either continuously or by batches. When operated continuously the cineole-hydrocarbon mixture is continuously fed to the chamber 1 and cresol, as necessary to replace any which is lost, may be added at any suitable point such as the chamber 5, fractionating column 6 or tank 15.

It should be understood that the apparatus shown is merely exemplary of one means for carrying out the processes of this invention and that other suitable types which may be possible or desirable are contemplated.

What I claim and desire to protect by Letters Patent is:

1. The method of separating cineoles from hydrocarbons of similar boiling range which comprises subjecting the cineole-hydrocarbon mixture to steam distillation under a vacuum of 27 to 28 inches of mercury, passing the cineole-hydrocarbon water vapors so formed into a cresol solution, whereby the cineole forms an addition compound with the cresol, maintaining the temperature of the cresol within the range of 50-65° C., whereby the hydrocarbons distill off, passing the hydrocarbon vapors together with any cineole, cresol and water vapors through a plate column in countercurrent relation to cresol and a cresol-cineole mixture, withdrawing the hydrocarbons as a separate distillate fraction and separately distilling the cineole-cresol mixture to recover the cineole in a substantially pure state.

2. The method of separating cineoles from hydrocarbons of similar boiling range which comprises subjecting the cineole-hydrocarbon mixture to steam distillation in the presence of a phenolic body in a liquid state, maintaining the cineole-hydrocarbon phenolic body mixture at a temperature within the range of from 50° C. to 65° C., withdrawing the hydrocarbons as a separate distillate fraction and distilling the cineole-phenolic body mixture to recover the cineole in a substantially pure state.

3. The method of separating cineoles from hydrocarbons of similar boiling range which comprises subjecting the cineole-hydrocarbon mixture to steam distillation in the presence of a phenolic body in a liquid state, maintaining the cineole-hydrocarbon phenolic body mixture at a temperature within the range of from 50° C. to 65° C. and at pressure within the range of 27 to 28 inches of mercury, withdrawing the hydrocarbons as a separate distillate fraction and distilling the cineole-phenolic body mixture to recover the cineole in a substantially pure state.

4. The method of separating cineoles from hydrocarbons of similar boiling range which comprises subjecting the cineole-hydrocarbon mixture to steam distillation in the presence of a phenolic body in a liquid state, maintaining the cineole-hydrocarbon phenolic body mixture at a temperature sufficient to cause substantially all of the hydrocarbons to be distilled off, withdrawing the hydrocarbons as a separate distillate fraction and distilling the cineole-phenolic body mixture to recover the cineole in a substantially pure state.

5. The method of separating cineoles from hydrocarbons of similar boiling range which comprises subjecting the cineole-hydrocarbon mixture to steam distillation, passing the vapors of the cineole-hydrocarbons and water formed by said distillation into a liquid phenolic body phase, maintaining the liquid and vapor phases at a temperature sufficient to cause substantially all of the hydrocarbons to be distilled off, withdrawing the hydrocarbons as a separate distillate fraction and distilling the cineole-phenolic body mixture to recover the cineole in a substantially pure state.

6. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising cresols, maintaining the liquid and vapor phases at a temperature sufficient to cause substantially all of the hydrocarbons to be distilled off, withdrawing the hydrocarbons as a separate distillate fraction and distilling the cineole-cresol mixture to recover the cineole in a substantially pure state.

7. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising orthocresol, maintaining the liquid and vapor phases at a temperature sufficient to cause substantially all of the hydrocarbons to be distilled off, withdrawing the hydrocarbons as a separate distillate fraction and distilling the cineole-orthocresol mixture to recover the cineole in a substantially pure state.

8. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising resorcinol, maintaining the liquid and vapor phases at a temperature sufficient to cause substantially all of the hydrocarbons to be distilled off, withdrawing the hydrocarbons as a separate distillate fraction and distilling the cineole-resorcinol mixture to recover the cineole in a substantially pure state.

9. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising paracresol, maintaining the liquid and vapor phases at a temperature sufficient to cause substantially all of the hydrocarbons to be distilled off, withdrawing the hydrocarbons as a separate distillate fraction and distilling the cineole-paracresol mixture to recover the cineole in a substantially pure state.

10. The method of separating cineoles from hydrocarbons of similar boiling range which comprises subjecting the cineole-hydrocarbon mixture to steam distillation, passing the vapors of the cineole-hydrocarbons and water formed by said distillation into a liquid phenolic body phase, maintaining the liquid and vapor phases at a temperature within the range from about 50° C. to 65° C. whereby substantially all of the hydrocarbons are distilled off, withdrawing the hydrocarbons as a separate distillate fraction and distilling the cineole-phenolic body mixture to recover the cineole in a substantially pure state.

11. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising cresols, maintaining the liquid and vapor phases at a temperature within the range from about 50° C. to about 65° C. whereby substantially all of the hydrocarbons are distilled off, withdrawing the hydrocarbons as a separate distillate fraction and distilling the cineole-cresol mixture to recover the cineole in a substantially pure state.

12. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising orthocresol, maintaining the liquid and vapor phases at a temperature within the range from about 50° C. to 65° C. whereby substantially all of the hydrocarbons are distilled off, withdrawing the hydrocarbons as a separate distillate fraction and distilling the orthocresol mixture to recover the cineole in a substantially pure state.

13. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising resorcinol, maintaining the liquid and vapor phases at a temperature within the range from about 50° C. to 65° C. whereby substantially all of the hydrocarbons are distilled off, withdrawing the hydrocarbons as a separate distillate fraction and distilling the cineole-resorcinol mixture to recover the cineole in a substantially pure state.

14. The method of separating cineoles from hydrocarbons of similar boiling range which comprises subjecting the cineole-hydrocarbon mixture to steam distillation, passing the vapors of the cineole-hydrocarbons and water formed by said distillation into a liquid phase comprising paracresol, maintaining the liquid and vapor phases at a temperature within the range from about 50° C. to 65° C. whereby substantially all of the hydrocarbons are distilled off, withdrawing the hydrocarbons as a separate distillate fraction and separately distilling the paracresol mixture to recover the cineole in a substantially pure state.

DONALD H. SHEFFIELD.